Patented Nov. 1, 1932

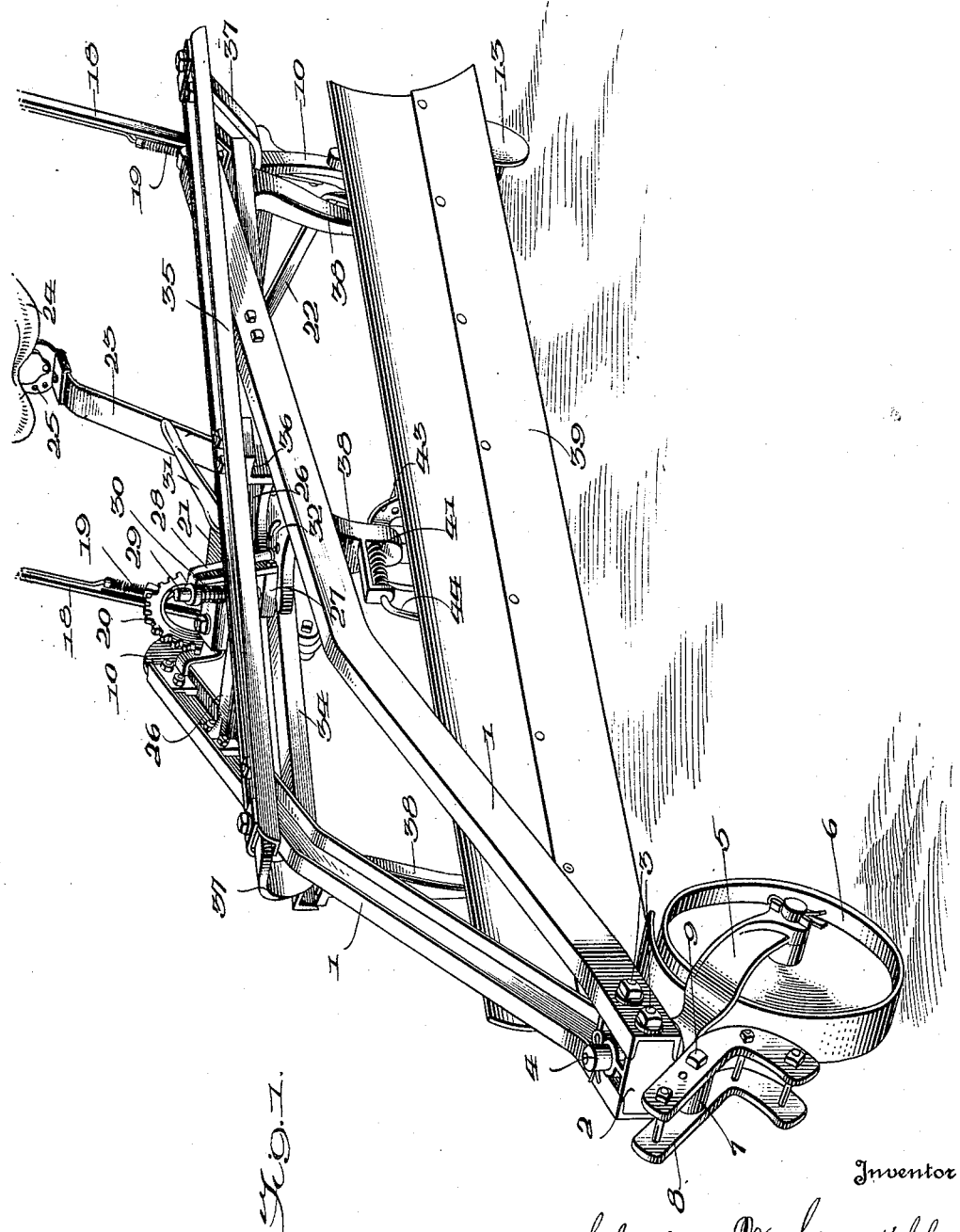

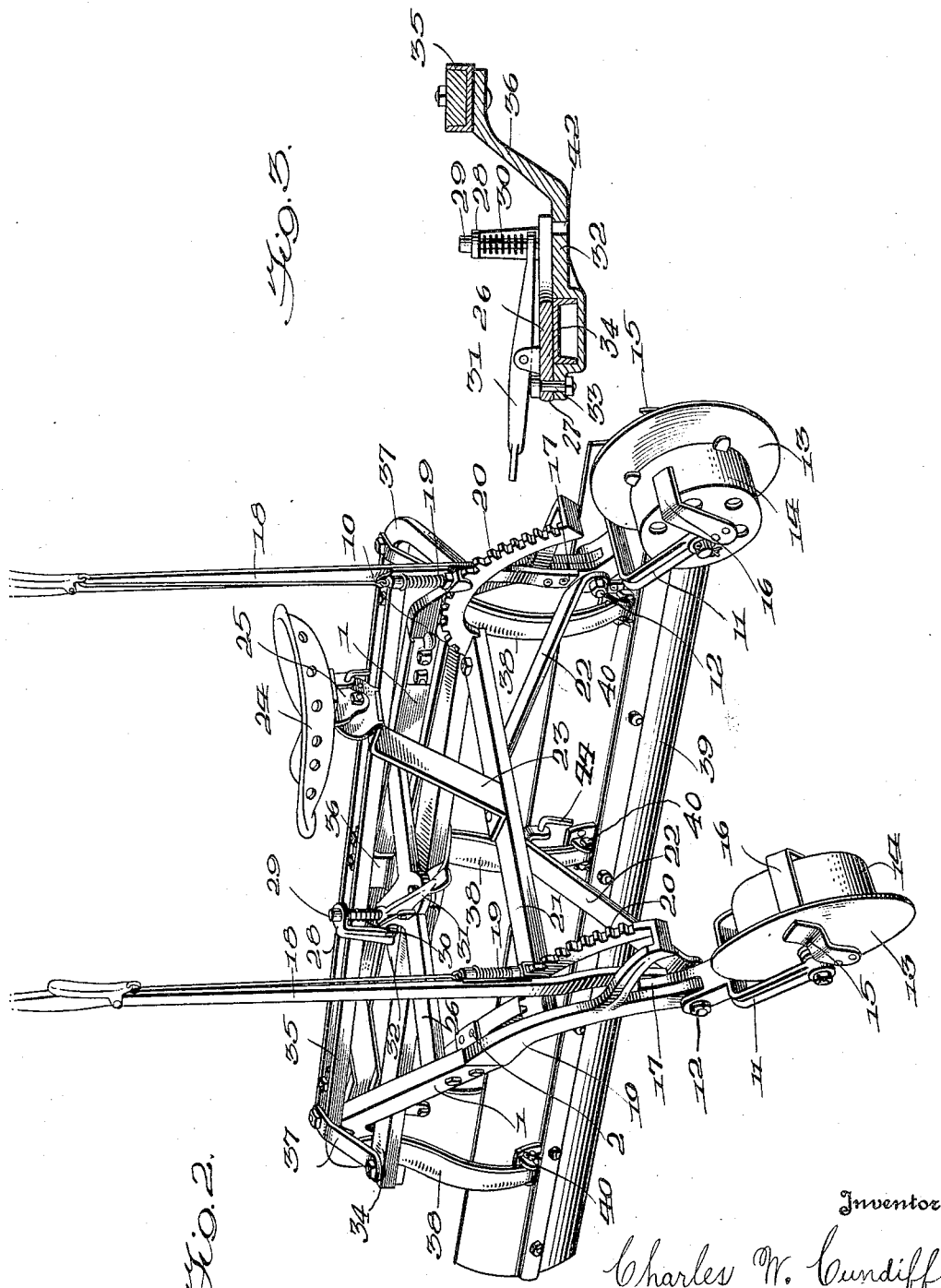

1,885,804

UNITED STATES PATENT OFFICE

CHARLES W. CUNDIFF, OF OWENSBORO, KENTUCKY, ASSIGNOR TO OWENSBORO DITCHER & GRADER CO., INC., OF OWENSBORO, KENTUCKY, A CORPORATION OF KENTUCKY

TERRACER, ROAD GRADER, AND DITCHER

Application filed July 17, 1930. Serial No. 468,641.

This invention relates to an improved terracer, road grader and ditcher, and is developed for the purpose of farm terracing, grading, ditching, leveling land, building roads, moving snow and dirt or other material, or in fact wherever such a machine should be desired.

The object of the invention is to improve the structure of the machine to permit the blade to be shifted from side to side for either right or left-hand grading, ditching or terracing, to provide a central draft for the machine due to the character of the frame, and to rigidly brace and support the parts of the machine that it may withstand the wear to which it may be subjected.

In the accompanying drawings:

Fig. 1 is a perspective view of the machine from the front;

Fig. 2 is a similar view from the rear, and showing the scraper shifted to the opposite side from that shown in Fig. 1; and Fig. 3 is a detail sectional view through the fifth wheel for adjusting the scraper.

The machine is constructed with a V-shaped frame formed of side beams 1 converging at the front of the machine and being secured together upon opposite sides of a bearing block 2, through which bolts 3 extend to securely lock in place the bearing for the spindle 4, which is attached to the fork 5 of the front wheel 6. The bearing block 2 is provided with an eyelet 7 at the front thereof for receiving a draft hitch 8, which embraces the eyelet 7 and is secured thereto by a bolt 9. This bolt is removable to allow the draft hitch to be turned upside down or otherwise adjusted to regulate the height of the draft at the front of the machine.

The convergence of the side beams 1 to form a U-shape frame with the draft at the apex thereof provides a center pull, which equalizes the power on different sides of the machine.

At their rear ends, the beams 1 have extension arms 10 rigidly fixed thereto and extending downwardly therefrom, as shown in Fig. 2. The extreme ends of the arms 10 have forks 11 pivoted thereto as on the bolts 12. The forks 11 carry disc wheels 13, on the inner faces of which are fixed drums 14. The disc wheels are so constructed as to cut down into the ground to the surface of the drums 14 to prevent the machine from skidding when in operation and to hold it in place when the machine is operating on a grade. The drums 14 serve to keep the disc wheels from cutting too deep into the ground so that the machine can be better controlled against side skidding.

The disc wheels 13 are provided with side scrapers 15, while scrapers 16 are provided for the drums 14. These scrapers are fixed to arms projecting outwardly from and carried by the forks 11 and serve to clean the wheels, preventing them from getting clogged with dirt.

At their front ends, the forks 11 are extended beyond the pivots 12 on the inner sides of the arms 10 in the form of projecting lugs 17, to which are fixed levers 18 provided with the usual ratchets 19 to engage the notched quadrants 20 carried by the arms 10. The levers 18 and the ratchet mechanism connected therewith are for the purpose of swinging the forks 11 and wheels 13 to raise or lower the rear end of the machine and likewise regulate the depth of cut of the blade.

The rear ends of the side beams 1 are braced by means of a cross brace 21, from which diagonal braces 22 extend downward to the pivots 12 to brace the disc wheels and the arms 10.

Fixed to the cross brace 21 is a seat bracket 23 for supporting the rear seat 24, on which the operator for the machine rides. Suitable adjusting mechanism, designated generally by the numeral 25, may be provided to regulate the angle at which the seat may be adjusted, as when the machine is operating on a grade.

A cross bar 26 extends between the rear ends of the side beams 1 and is rigidly bolted or otherwise fixed thereto, so as to brace the V-shaped frame and also to serve as a pivotal support for the blade. The cross bar 26 has a forwardly projecting arm 27 at the front thereof, as shown in Figs. 1 and 3, from which a bracket 28 extends upwardly over this arm. A vertical pin 29 is mounted in the arm 27 and bracket 28 to slide therein, being normally pressed downward by means of a spring 30. A foot lever 31 has the fork thereof engaging the pin 29 to raise the same whenever desired.

A fifth wheel 32 is connected with the cross bar 26 by means of a king-bolt 33, on which the fifth wheel is pivotally mounted to be turned relative to the cross bar 26.

A blade cross bar 34 is fixed in the fifth wheel 32, as shown in Fig. 3, while a similar blade cross bar 35 is rigidly fixed to an upstanding arm 36 carried by the fifth wheel 32. The outer ends of the blade cross bars 34 and 35 are fixed together by means of brace arms 37.

Hanger bars 38 are suspended from the blade cross bar 34 and carry the scraper blade 39 at their lower ends, the scraper blade being pivoted to the hanger bars as at 40 and may be provided with ratchet mechanism, designated generally by the numeral 41, for adjusting the scraper blade either forward or backward to give it a straighter or more curved position.

The adjusting means 41 may comprise a bracket 43 fixed to the back side of the blade 39 and extending beside one of the hanger bars 38, as shown in Fig. 1, to be engaged by a spring-pressed pin 44 extending through the hanger bar 38 and an opening in the bracket 43.

The mounting of the scraper blade 39 and the suspension of it by means of the three hanger bars 38 from the blade cross bars 34 and 35 serve to securely brace the blade, making it stronger and more rigid in its mounting and at the same time permitting the blade to be reversed from right to left or left to right, or in fact set at any angle desired, either right or left or straight across. This adjustment is permitted by providing a plurality of holes 42 in the fifth wheel for receiving the pin 29 to hold the blade in its set position. Upon withdrawing the pin by means of the foot lever 31, the blade may be shifted to a different angle, and upon release of the foot lever the pin 29 enters another hole in the fifth wheel 32, to hold the blade in its set position.

The machine may be operated by either horses or a tractor, for either of which the V-shaped frame provides a center draft, and if desired the point of the draft may be raised or lowered. The swiveled front wheel permits the machine to be easily turned around or turned at angles when pulling the same. The machine may be set for different angles and different grades, since the rear disc wheels 13 are individually adjusted.

I claim:

1. In a machine of the character described, the combination of a supporting frame, a cross bar carried thereby, a scraping blade, blade cross bars supporting the blade, a fifth wheel pivoted to the first-mentioned cross bar and fixed to one of the blade cross bars, for adjusting the angle of the blade to the frame, and means for locking the blade in said angular position.

2. In a machine of the character described, the combination of a frame, a cross bar carried thereby, a scraping blade, blade cross bars carrying the blade and connected together, a fifth wheel fixed to one of the blade cross bars, a king-pin pivotally connecting the fifth wheel with the first-mentioned cross bar to permit angular adjustment of the blade to the frame, and lever controlled means connected with the first-mentioned cross bar for locking the fifth wheel in an adjusted position.

3. In a machine of the character described, the combination of frame side bars, downwardly inclined extension arms attached to the outer ends of the side bars, wheel supports pivoted to the extension arms, wheels connected with said supports, a cross-bar secured between the side bars, and braces extending from an intermediate portion of the cross-bar to the extension arms.

4. In a machine of the character described, the combination of side bars, a fixed cross-bar connected therewith, upper and lower blade cross-bars extending across on opposite sides of the fixed cross-bar, the upper blade cross-bar being off-set out of vertical alignment with the lower cross-bar, means rigidly connecting the blade cross-bars together, means pivotally connecting only one of said blade cross-bars with the fixed cross-bar, and a blade suspended from the blade cross-bars.

5. In a machine of the character described, the combination of side bars, a fixed cross-bar connected therewith, upper and lower blade cross-bars extending across on opposite sides of the fixed cross-bar, the upper blade cross-bar being off-set out of vertical alignment with the lower cross-bar, brace arms rigidly connecting the adjacent end portions of the blade cross-bars together at the opposite ends thereof, means pivotally connecting only the lower blade cross-bar with the fixed cross-bar, and a blade suspended from the lower blade cross-bar.

6. In a machine of the character described, the combination of a supporting frame, a fixed cross-bar connected therewith, a blade cross-bar for supporting a blade, a fifth-wheel fixed to the blade cross-bar and pivoted to the fixed cross-bar for adjusting the angle of the blade to the frame, and means for locking the blade in said adjusted position.

7. In a machine of the character described, the combination of a frame, a fixed cross-bar connected therewith, a blade cross-bar for supporting a blade, a fifth-wheel fixed to the blade cross-bar, a king-pin pivotally connecting the fifth-wheel with the fixed cross-bar to angularly adjust the blade relative to the frame, and lever controlled means connected with the fixed cross-bar for locking the fifth-wheel in an adjusted position.

8. In a machine of the character described, the combination of a frame, a fixed cross-bar connected therewith, a blade cross-bar for supporting a blade, a fifth-wheel fixed to the blade cross-bar, a king-pin pivotally connecting the fifth-wheel with the fixed cross-bar to angularly adjust the blade relative to the frame, a spring-pressed pin connected with the fixed cross-bar in position to engage and lock the fifth-wheel in an adjusted position, and a lever for controlling said spring-pressed pin.

9. In a machine of the character described, the combination of a frame, a scraping blade, arms suspended from the frame at opposite ends of the blade and pivotally supporting said blade, an intermediate arm suspended from the frame and pivoted to an intermediate portion of the blade, a perforated segment fixed to the blade, and a horizontally projecting spring-pressed pin carried by the intermediate arm and engaging the segment.

10. In a machine of the character described, the combination of a frame having side bars, a cross-bar extending between the side bars and fixed thereto, the side bars being extended downwardly and outwardly beyond the cross-bar, yokes pivoted to the outer ends of the extended portions of the side bars, a disk wheel having a drum at a side thereof mounted in each yoke, and a lever attached to each yoke for adjusting the wheel relative to the frame.

In testimony whereof I affix my signature.

CHARLES W. CUNDIFF.